Figure 1:
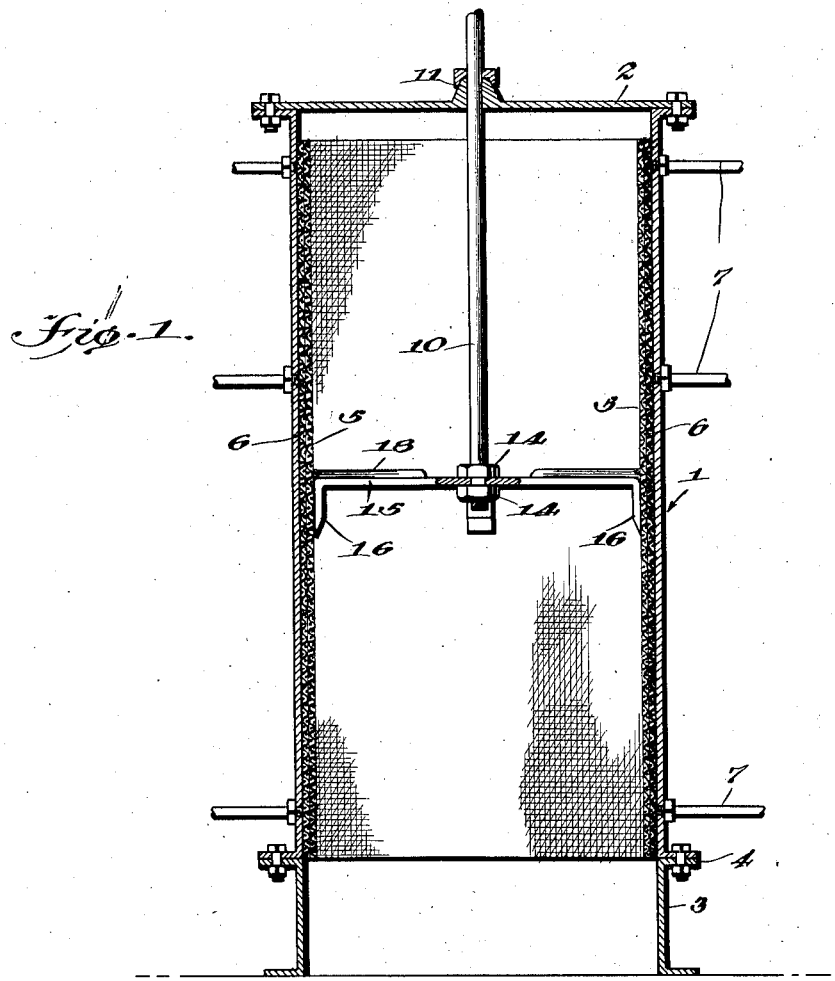

Oct. 30, 1928.

C. ST. C. BURNS 1,689,277

CLEANER FOR FILTERING ELEMENTS

Filed Sept. 24, 1927

INVENTOR
C. S. Burns,
BY
ATTORNEY

Patented Oct. 30, 1928.

1,689,277

UNITED STATES PATENT OFFICE.

CHARLES ST. CLAIR BURNS, OF PORT ARTHUR, TEXAS, ASSIGNOR OF ONE-HALF TO FOIST KAY, OF PORT ARTHUR, TEXAS.

CLEANER FOR FILTERING ELEMENTS.

Application filed September 24, 1927. Serial No. 221,739.

This invention relates in general to filters and more particularly to cleaners for the filtering elements thereof.

A primary object of the invention is to provide simple and efficient means for removing excess solids from the filtering elements of a filter.

Figure 2:
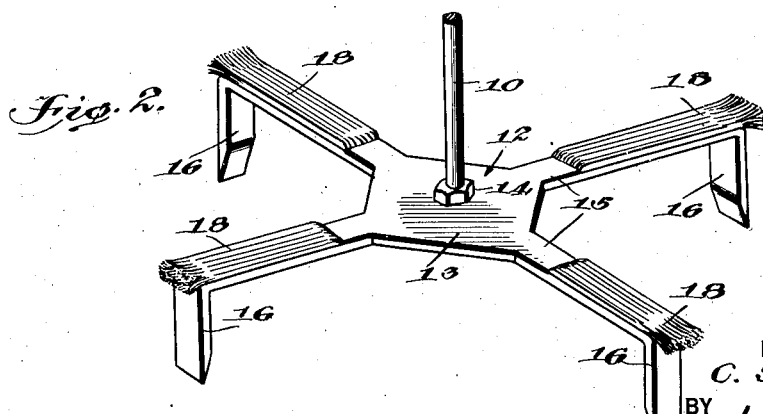

In carrying out these objects, the invention is susceptible of a wide range of modification without departing from the spirit or sacrificing any of the advantages of the claimed invention; there being shown in the drawings for illustrative purposes a preferred and practical form, in which:

Figure 1 represents a vertical section of a filter with this improved cleaner shown applied; and Fig. 2 is a fragmentary perspective view showing the cleaner constituting this invention.

In the embodiment illustrated, a cylindrical tank 1 is shown having its upper end closed by an end plate 2 and a short cylinder 3 suitably secured to its lower end as at 4. This tank 1 provides a filter chamber and the cylinder 3 provides a sludge chamber. The cylindrical wall of the tank 1 is lined with layers of reticulated material designated at 5 and 6, and these layers may be of wire mesh or any other suitable filtering material, and overlie filtrate discharge pipes 7 which are connected to the cylindrical body of the tank.

For the purpose of removing the excess solids which build up on the inner layer 5, a cleaner is provided for removing such excess solids and depositing them in the sludge chamber 3. This cleaner includes a shaft 10 rotatably and slidably fitted in a stuffing box 11 provided in the head or end plate 2. The shaft 10 is rotated and reciprocated by any suitable power means and gearing.

At its lower end the shaft 10 has secured thereto a spider 12 having a hub 13 fastened by nuts 14 to the shaft 10 and having radial arms 15 terminating in scraper blades 16, the scraper blades 16 being extended angularly with respect to the spider arms and adapted to travel on the face of the surface to be cleaned. Wire brushes 18 are fixed to the spider arms 15 and project beyond the outer ends thereof, as is shown clearly in Fig. 2. When the shaft 11 is rotated and reciprocated both the scraper blades 16 and the wire brushes 18 operate to remove the excess solids from the inner layer 5 of the filter. The excess solids so removed fall down into the sludge chamber 3.

From the above description, it will be obvious that a cheap and effective cleaner is provided for the filtering element, and will keep said element clean during the life of the filter.

Without further description it is thought that the features and advantages of the invention will be readily apparent to those skilled in the art, and it will of course be understood that changes in the form, proportion and minor details of construction may be resorted to, without departing from the spirit of the invention or its scope as claimed.

I claim:—

1. The combination with a filter having a reticulated filtering element; of a cleaner for said element, comprising a shaft mounted for reciprocable and rotary movement through the filter, a spider fixed to said shaft and having scraper blades, and wire brushes also carried by said spider adjacent to and rearwardly of said blades.

2. A cleaning device for a filter comprising a spider having scraper blades of rigid material extending in a plane at right angles thereto and wire brushes carried by the spider and projecting beyond the plane of the blades.

3. A cleaning device for filters comprising a shaft adapted to be reciprocated and rotated in the filter, a spider fixed to said shaft and having arms with scraper blades extending in planes at right angles thereto, and wire brushes carried by said arms and projecting in a plane beyond the scraper blades.

CHARLES ST. CLAIR BURNS.